United States Patent
Chuang

(10) Patent No.: US 8,053,177 B2
(45) Date of Patent: Nov. 8, 2011

(54) LIGHT BLOCKING PLATE, LENS MODULE HAVING SAME AND METHOD FOR MAKING SAME

(75) Inventor: Hsin-Hung Chuang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 467 days.

(21) Appl. No.: 12/327,557

(22) Filed: Dec. 3, 2008

(65) Prior Publication Data

US 2009/0268302 A1    Oct. 29, 2009

(30) Foreign Application Priority Data

Apr. 25, 2008   (CN) .......................... 2008 1 0301315

(51) Int. Cl.
*G03F 7/20* (2006.01)
*G02B 1/04* (2006.01)
(52) U.S. Cl. .......................... 430/321; 427/162; 264/2.5
(58) Field of Classification Search ........................ None
See application file for complete search history.

(56) References Cited

U.S. PATENT DOCUMENTS 6,160,606 A * 12/2000 Sprague .......................... 349/159
6,324,010 B1 * 11/2001 Bowen et al. .................. 359/622
2006/0251972 A1   11/2006 Lee

FOREIGN PATENT DOCUMENTS

CN        1854782 A    11/2006

OTHER PUBLICATIONS

"Using Elastomeric Membranes as Dry Resists and for Dry Lift-Off" by Jackman et al. (Mar. 1999).*
Rebecca J, Jackman et al., Using Elastomeric Membranes as Dry Resists and for Dry Lift-off, Langmuir 1999 vol. 15, P2973-2984, Published on Web Mar. 29, 1999.

* cited by examiner

*Primary Examiner* — John A. McPherson
(74) *Attorney, Agent, or Firm* — Altis Law Group, Inc.

(57) ABSTRACT

An exemplary light blocking plate includes a through hole defined at the center thereof and an opaque portion surrounding the through hole. The light blocking plate is comprised of a blackening agent and a PDMS.

5 Claims, 8 Drawing Sheets

LIGHT BLOCKING PLATE, LENS MODULE HAVING SAME AND METHOD FOR MAKING SAME

BACKGROUND

1. Technical Field

The present invention relates to a light blocking plate, a lens module having the light blocking plate and a method for making the light blocking plate.

2. Description of Related Art

Nowadays, lens modules have been widely used in various portable electronic devices. The lens modules of portable electronic devices have become smaller and smaller in size. Accordingly, it is required that optical elements (e.g., a light blocking plate) used in the lens module have a smaller size/volume.

A typical light blocking plate is made by processing a plastic/metal tape. The thickness of the light blocking plate is limited by the thickness of the plastic/metal tape. The thickness of the light blocking plate is generally larger than 30 μm. Such a light blocking plate may not meet the demand for the miniature of the lens module.

Therefore, a new light blocking plate and a new method for making the same are desired to overcome the above mentioned problems.

SUMMARY

An exemplary light blocking plate includes a through hole defined at the center thereof and an opaque portion surrounding the through hole. The light blocking plate is comprised of a blackening agent and a polydimethylsiloxane (PDMS).

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
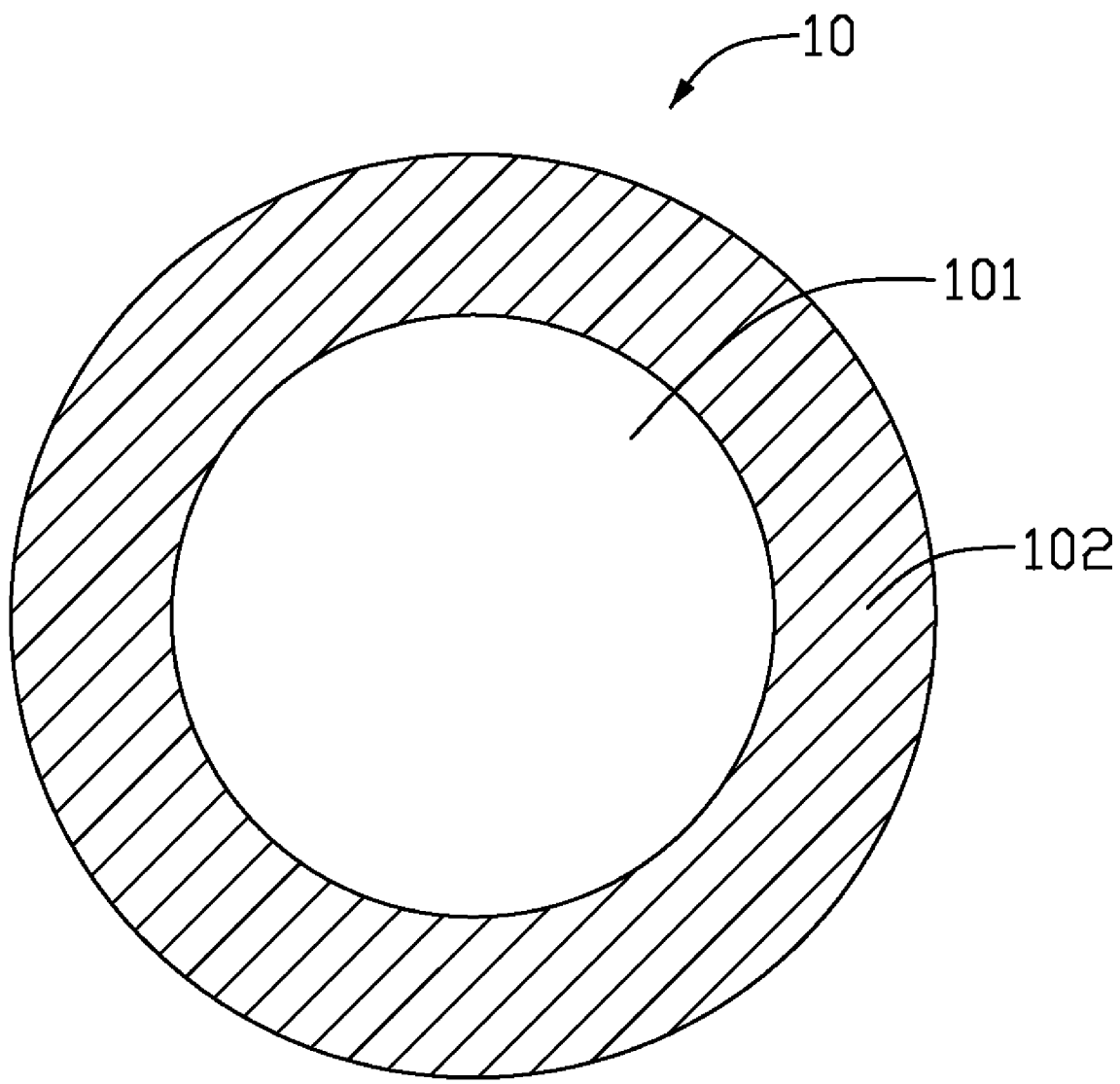
FIG. 1 is a schematic, plan view of a light blocking plate according to a first embodiment.

Referring to FIG. 1, a light blocking plate 10 in accordance with a first embodiment is shown. The light blocking plate 10 includes a though hole 101 defined at the center and an opaque portion 102 surrounding the through hole 101. The light blocking plate 10 is comprised of a polydimethylsiloxane (PDMS) and a blackening agent. Because the PDMS is light pervious, a blackening agent is added to the PDMS to create the opaque effect to block light. The blackening agent can be a carbon black or a toluene. In addition, the light blocking plate 10 can further be comprised of a hardener. The light blocking plate 10 can be circular or rectangular. The thickness of the light blocking plate 10 is in an approximate range from 10 μm to 30 μm.

Figure 2:
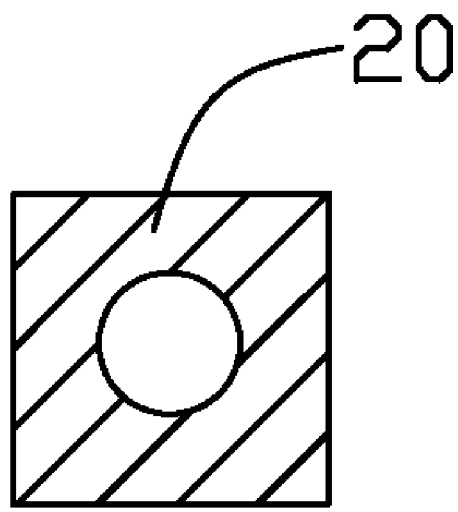
FIG. 2 is a schematic, plan view of a light blocking plate according to a second embodiment.

Referring to FIG. 2, a light blocking plate 20 in accordance with a second embodiment is shown. The light blocking plate 20 is similar to the light blocking plate 10 except that the light blocking plate 20 is square.

A method for making the light blocking plate 20 will be described as follows.

Figure 3:
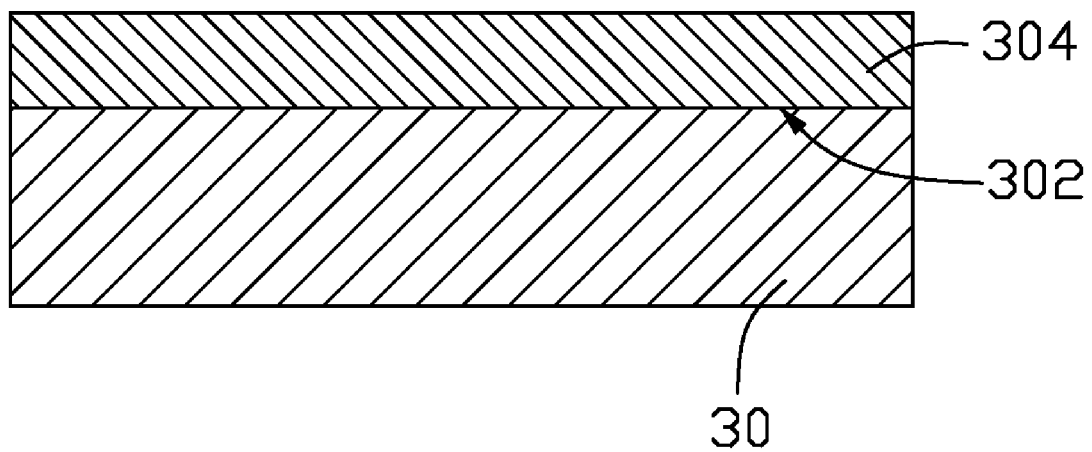
FIGS. 3-7 are schematic views showing successive stages of a method for making the light blocking plate shown in FIG. 1.

Firstly, referring to FIG. 3, a substrate 30 is provided and a photoresist layer 304 is formed on a surface 302 of the substrate 30. The substrate 30 is made of silicon. In the present embodiment, the photoresist layer 304 is a negative photoresist layer. It is to be understood that the photoresist layer 304 can also be a positive layer.

Figure 4:
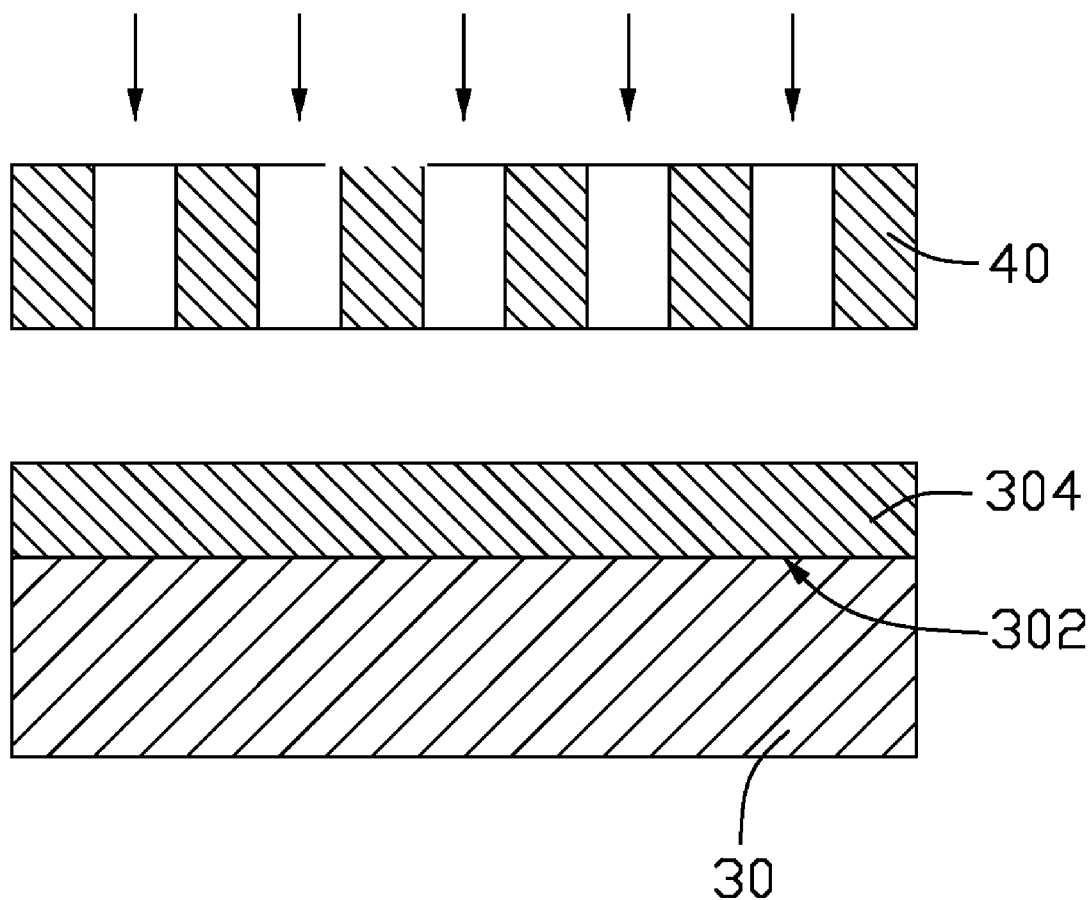

Secondly, referring to FIG. 4, a photomask 40 with a predetermined pattern is placed between the photoresist layer 304 and a UV light source (not shown), and then the photoresist layer 304 is exposed to a UV light emitted from the UV light source.

Figure 5:
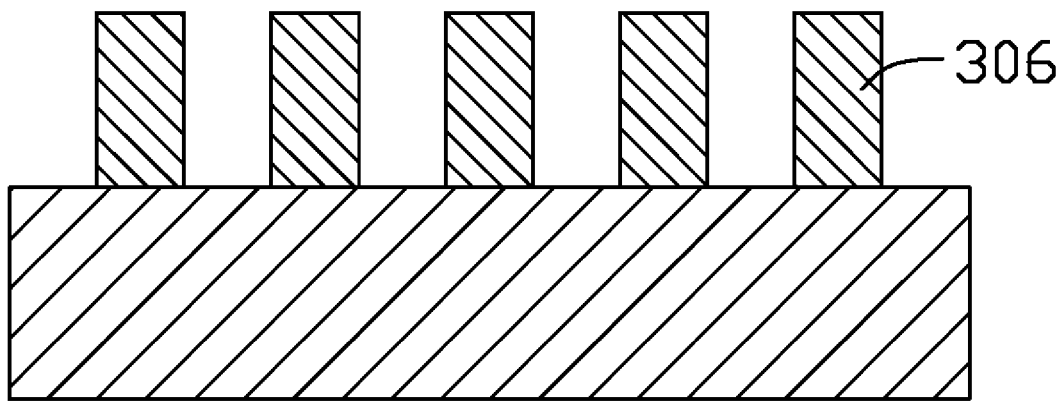

Thirdly, referring to FIG. 5, the photoresist layer 304 is developed to form a cylinder array 306. The cylinder array 306 includes a plurality of cylinders (not labeled). Each cylinder extends in a direction substantially perpendicular to the surface 302 of the substrate 30. The height of each cylinder is in an approximate range from 50 μm to 100 μm.

Figure 6:
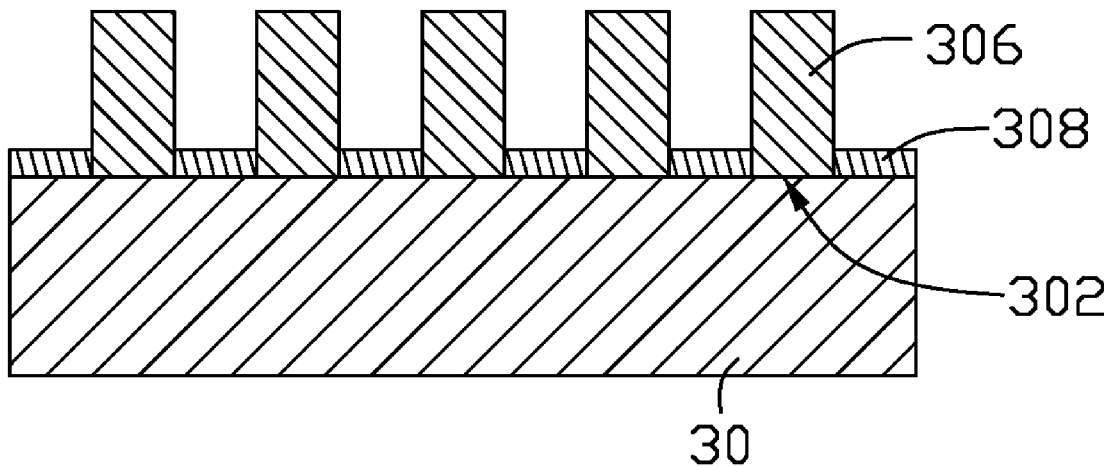

Fourthly, referring to FIG. 6, a film 308 is formed on the surface 302 of the substrate 30, and then solidified. The film 308 is comprised of a PDMS and a blackening agent. The thickness of the film 308 should be less than the height of each cylinder so that each cylinder extends through the film 308. The film 308 can be formed by spin coating. In spin coating process, the thickness of the film 308 can be effectively controlled.

Figure 7:
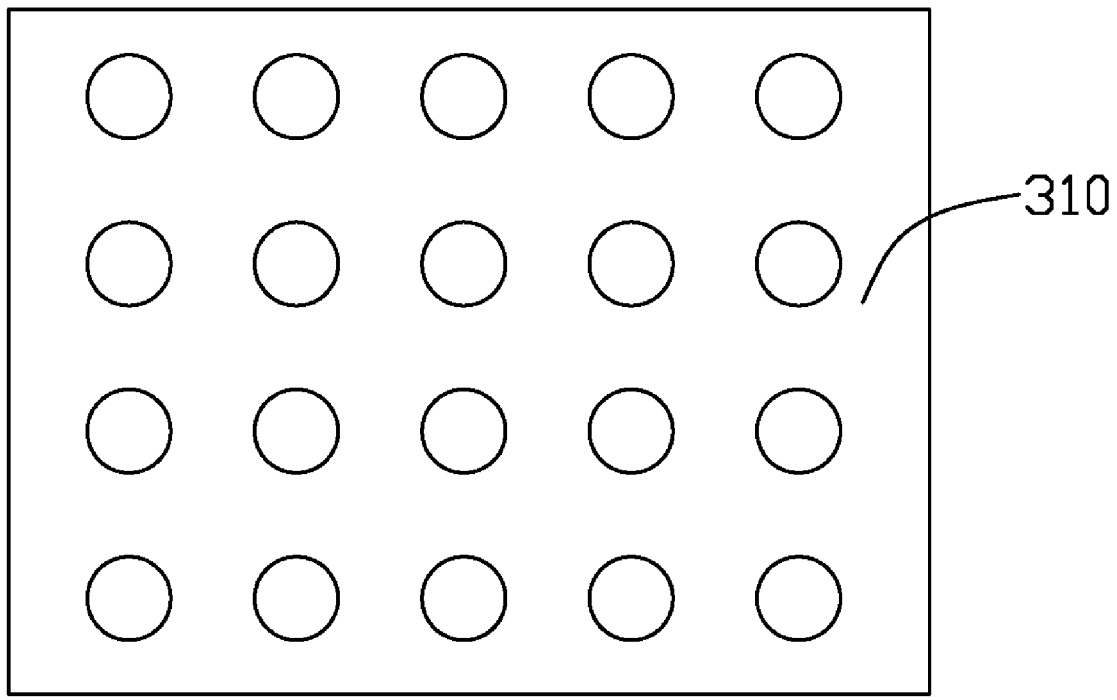

Fifthly, the substrate 30 is turned over, and then the solidified film 308 is separated from the substrate 30 and the cylinder array 306, thus obtaining a light blocking plate module 310 (see FIG. 7).

Lastly, the light blocking plate module 310 is divided/cutting into a plurality of light blocking plates 20, one of which is shown in FIG. 2.

In the above method, the thickness of the light blocking plate 20 is determined by the thickness of the film 308. By controlling the thickness of the film 308, a light blocking plate 20 having a small thickness can be achieved. Particularly, in spin coating process, the thickness of the film 308 to be formed can be effectively controlled.

Figure 8:
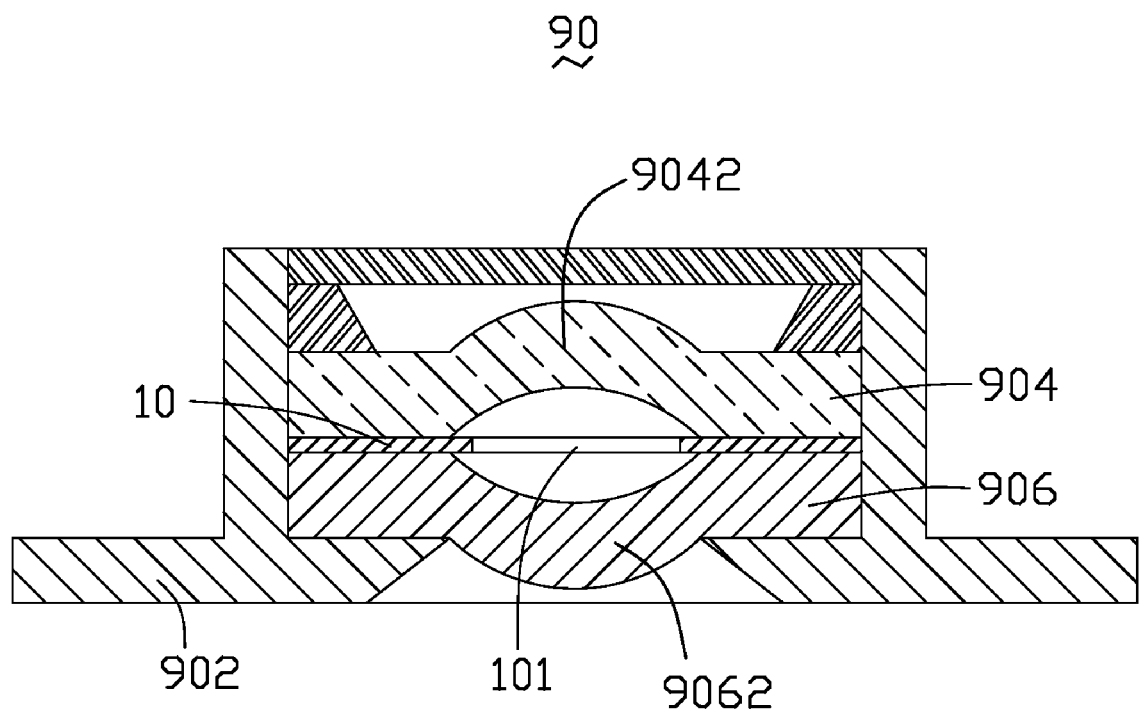
FIG. 8 is a schematic, cross-sectional view of a lens module employing the light blocking plate in FIG. 1.

Referring to FIG. 8, a lens module 90 employing the light blocking plate 10 of FIG. 1 is shown. The lens module 90 includes a barrel 902, a first lens 904, a second lens 906, and the light blocking plate 10. The light blocking plate 10 is sandwiched between the first and the second lenses 904 and 906. The first lens 904 includes an optically active part 9042, and the second lens 906 includes an optically active part 9062. The through hole 101 of the light blocking plate 10 aligns with the optically active parts 9042 and 9046.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A method for making light blocking plates, the method comprising:

forming a plurality of cylinders on a surface of a substrate, each cylinder extending substantially perpendicularly from the surface of the substrate;

forming a film on the surface of the substrate, the film being comprised of a polydimethylsiloxane (PDMS) and a blackening agent, the cylinders extending through the film;

solidifying the film;

separating the solidified film from the substrate and the cylinders, thus obtaining a light blocking plate module including a plurality of light blocking plates; and cutting the light blocking plate module into the separated light blocking plates.

2. The method as claimed in claim 1, wherein the thickness of the film is less than the length of each cylinder.

3. The method as claimed in claim 2, wherein the length of each cylinder is in a range from about 50 μm to about 100 μm.

4. The method as claimed in claim 1, wherein the cylinder array is formed on the surface of the substrate by the following steps:

forming a photoresist layer on the surface of the substrate;

exposing the photoresist layer using a photomask; and developing the photoresist layer to form the plurality of cylinders on the surface of the substrate.

5. The method as claimed in claim 1, wherein the film is formed on the surface of the substrate by spin coating.

* * * * *